United States Patent
Hasegawa

(10) Patent No.: US 10,232,608 B2
(45) Date of Patent: Mar. 19, 2019

(54) DROPLET EJECTION CONTROL APPARATUS, DROPLET EJECTION CONTROL METHOD, AND DROPLET EJECTION CONTROL PROGRAM

(71) Applicant: SEIKO EPSON CORPORATION, Tokyo (JP)

(72) Inventor: Tomonaga Hasegawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/440,395

(22) Filed: Feb. 23, 2017

(65) Prior Publication Data

US 2017/0253025 A1    Sep. 7, 2017

(30) Foreign Application Priority Data

Mar. 1, 2016 (JP) ................. 2016-038648

(51) Int. Cl.
 *B41J 2/045* (2006.01)
(52) U.S. Cl.
 CPC ....... *B41J 2/04535* (2013.01); *B41J 2/04586* (2013.01)
(58) Field of Classification Search
 CPC ........ B41J 2/2132; B41J 2/2146; B41J 2/155; B41J 2/04586; B41J 2202/21; B41J 2/04505; B41J 29/38; B41J 29/393; B41J 2/04535

USPC .......................................... 347/9, 12, 13, 14
See application file for complete search history.

(56) References Cited

U.S. PATENT DOCUMENTS

2012/0026229 A1    2/2012    Kato et al.
2016/0243862 A1*   8/2016    Yoshida ................. B41J 2/2132

FOREIGN PATENT DOCUMENTS

JP     2012-030512 A    6/2012

* cited by examiner

*Primary Examiner* — Jannelle M Lebron

(57) ABSTRACT

Droplet ejection amounts are adjusted during a process of generating raster data, and this process is realized by a control circuit. The sum total of droplet ejection amounts exceeds 100% as for three nozzles while the sum total of droplet ejection amount is below 100% as for one nozzle, which is repeated at some nozzle numbers. The sum total of droplet ejection amounts is 100% in a normal portion. As such, in the case where this sum total is taken as a reference amount, the sum total of droplet ejection amounts for each raster in a region where overlap printing is performed is sequentially changed to be equal to or greater than the reference amount in the normal region where the overlap printing is not performed, and to be equal to or smaller than the above reference amount.

9 Claims, 16 Drawing Sheets

FIG. 8

| NOZZLE NUMBER | SHARING RATIO | | DISTANCE BETWEEN NOZZLES | | |
|---|---|---|---|---|---|
| | TOP NOZZLE | BOTTOM NOZZLE | ±0 μm | +42 μm | −42 μm |
| 1 | 255 | 5 | 101.9608 | 100.0000 | 101.9608 |
| 2 | 253 | 7 | 101.9608 | 101.1765 | 102.7451 |
| 3 | 251 | 9 | 101.9608 | 101.1765 | 102.7451 |
| 4 | 249 | 11 | 101.9608 | 101.1765 | 102.7451 |
| 5 | 247 | 14 | 102.3529 | 101.1765 | 103.1373 |
| 6 | 244 | 16 | 101.9608 | 101.1765 | 103.1373 |
| 7 | 241 | 18 | 101.5686 | 100.7843 | 102.7451 |
| 8 | 238 | 23 | 102.3529 | 100.3922 | 103.5294 |
| 9 | 215 | 26 | 94.5098 | 93.3333 | 103.5294 |
| 10 | 215 | 49 | 103.5294 | 94.5098 | 103.5294 |
| 11 | 215 | 49 | 103.5294 | 103.5294 | 103.5294 |
| 12 | 215 | 49 | 103.5294 | 103.5294 | 103.5294 |
| 13 | 190 | 49 | 93.7255 | 93.7255 | 103.5294 |
| 14 | 190 | 74 | 103.5294 | 93.7255 | 103.5294 |
| 15 | 190 | 74 | 103.5294 | 103.5294 | 103.5294 |
| 16 | 190 | 74 | 103.5294 | 103.5294 | 103.5294 |
| 17 | 165 | 74 | 93.7255 | 93.7255 | 103.5294 |
| 18 | 165 | 99 | 103.5294 | 93.7255 | 103.5294 |
| 19 | 165 | 99 | 103.5294 | 103.5294 | 103.5294 |
| 20 | 165 | 99 | 103.5294 | 103.5294 | 103.5294 |
| 21 | 140 | 99 | 93.7255 | 93.7255 | 103.5294 |
| 22 | 140 | 126 | 104.3137 | 93.7255 | 104.3137 |
| 23 | 140 | 126 | 104.3137 | 104.3137 | 104.3137 |
| 24 | 140 | 126 | 104.3137 | 104.3137 | 104.3137 |
| 25 | 115 | 126 | 94.5098 | 94.5098 | 104.3137 |
| 26 | 115 | 151 | 104.3137 | 94.5098 | 104.3137 |
| 27 | 115 | 151 | 104.3137 | 104.3137 | 104.3137 |
| 28 | 115 | 151 | 104.3137 | 104.3137 | 104.3137 |
| 29 | 90 | 151 | 94.5098 | 94.5098 | 104.3137 |
| 30 | 90 | 176 | 104.3137 | 94.5098 | 104.3137 |
| 31 | 90 | 176 | 104.3137 | 104.3137 | 104.3137 |
| 32 | 90 | 176 | 104.3137 | 104.3137 | 104.3137 |
| 33 | 65 | 176 | 94.5098 | 94.5098 | 104.3137 |
| 34 | 65 | 199 | 103.5294 | 94.5098 | 103.5294 |
| 35 | 65 | 199 | 103.5294 | 103.5294 | 103.5294 |
| 36 | 65 | 199 | 103.5294 | 103.5294 | 103.5294 |
| 37 | 40 | 199 | 93.7255 | 93.7255 | 103.5294 |
| 38 | 40 | 224 | 103.5294 | 93.7255 | 103.5294 |
| 39 | 40 | 224 | 103.5294 | 103.5294 | 103.5294 |
| 40 | 40 | 224 | 103.5294 | 103.5294 | 103.5294 |
| 41 | 28 | 224 | 98.8235 | 98.8235 | 103.5294 |
| 42 | 26 | 234 | 101.9608 | 98.0392 | 102.7451 |
| 43 | 24 | 236 | 101.9608 | 101.1765 | 102.7451 |
| 44 | 22 | 238 | 101.9608 | 101.1765 | 102.7451 |
| 45 | 20 | 241 | 102.3529 | 101.1765 | 103.1373 |
| 46 | 17 | 243 | 101.9608 | 101.1765 | 103.1373 |
| 47 | 15 | 245 | 101.9608 | 101.1765 | 102.7451 |
| 48 | 13 | 247 | 101.9608 | 101.1765 | 102.7451 |
| 49 | 28 | 247 | 107.8431 | 107.8431 | 101.9608 |
| 50 | 26 | 255 | 110.1961 | 107.0588 | 110.9804 |

FIG. 11

COMPARISON LIST

| TONE VALUE | | EJECTION AMOUNT (%) | | |
|---|---|---|---|---|
| TOP NOZZLE | BOTTOM NOZZLE | ±0 μm | +42 μm | -42 μm |
| 255 | 0 | 100.0000 | 102.5000 | 97.5000 |
| 249 | 6 | 100.0000 | 102.5000 | 97.5000 |
| 242 | 13 | 100.0000 | 102.5000 | 97.5000 |
| 236 | 19 | 100.0000 | 102.5000 | 97.5000 |
| 230 | 26 | 100.0000 | 102.5000 | 97.5000 |
| 223 | 32 | 100.0000 | 102.5000 | 97.5000 |
| 217 | 38 | 100.0000 | 102.5000 | 97.5000 |
| 210 | 45 | 100.0000 | 102.5000 | 97.5000 |
| 204 | 51 | 100.0000 | 102.5000 | 97.5000 |
| 198 | 57 | 100.0000 | 102.5000 | 97.5000 |
| 191 | 64 | 100.0000 | 102.5000 | 97.5000 |
| 185 | 70 | 100.0000 | 102.5000 | 97.5000 |
| 179 | 77 | 100.0000 | 102.5000 | 97.5000 |
| 172 | 83 | 100.0000 | 102.5000 | 97.5000 |
| 166 | 89 | 100.0000 | 102.5000 | 97.5000 |
| 159 | 96 | 100.0000 | 102.5000 | 97.5000 |
| 153 | 102 | 100.0000 | 102.5000 | 97.5000 |
| 147 | 108 | 100.0000 | 102.5000 | 97.5000 |
| 140 | 115 | 100.0000 | 102.5000 | 97.5000 |
| 134 | 121 | 100.0000 | 102.5000 | 97.5000 |
| 128 | 128 | 100.0000 | 102.5000 | 97.5000 |
| 121 | 134 | 100.0000 | 102.5000 | 97.5000 |
| 115 | 140 | 100.0000 | 102.5000 | 97.5000 |
| 108 | 147 | 100.0000 | 102.5000 | 97.5000 |
| 102 | 153 | 100.0000 | 102.5000 | 97.5000 |
| 96 | 159 | 100.0000 | 102.5000 | 97.5000 |
| 89 | 166 | 100.0000 | 102.5000 | 97.5000 |
| 83 | 172 | 100.0000 | 102.5000 | 97.5000 |
| 77 | 179 | 100.0000 | 102.5000 | 97.5000 |
| 70 | 185 | 100.0000 | 102.5000 | 97.5000 |
| 64 | 191 | 100.0000 | 102.5000 | 97.5000 |
| 57 | 198 | 100.0000 | 102.5000 | 97.5000 |
| 51 | 204 | 100.0000 | 102.5000 | 97.5000 |
| 45 | 210 | 100.0000 | 102.5000 | 97.5000 |
| 38 | 217 | 100.0000 | 102.5000 | 97.5000 |
| 32 | 223 | 100.0000 | 102.5000 | 97.5000 |
| 26 | 230 | 100.0000 | 102.5000 | 97.5000 |
| 19 | 236 | 100.0000 | 102.5000 | 97.5000 |
| 13 | 242 | 100.0000 | 102.5000 | 97.5000 |
| 6 | 249 | 100.0000 | 102.5000 | 97.5000 |

DROPLET EJECTION CONTROL APPARATUS, DROPLET EJECTION CONTROL METHOD, AND DROPLET EJECTION CONTROL PROGRAM

BACKGROUND

1. Technical Field

The present invention relates to droplet ejection control apparatuses, droplet ejection control methods and droplet ejection control programs, and particularly relates to a droplet ejection control apparatus, a droplet ejection control method and a droplet ejection control program configured to perform overlap printing in a predetermine region and perform normal printing that does not overlap in another predetermined region.

2. Related Art

In a line printer disclosed in JP-A-2012-30512, a plurality of heads for respective colors each including a plurality of nozzle rows are disposed so that part of the nozzle rows overlap each other. In an overlap region, an error amount of impact position is determined in each nozzle row, and a ratio of nozzles used in the overlap region is changed in accordance with the error amount. In other words, nozzles with a small impact position error are used more in the overlap region.

SUMMARY

A technique disclosed in JP-A-2012-30512 needs to determine an amount of error in each nozzle row. Based on this, the above-mentioned ratio of nozzles needs to be separately changed in the overlap region in accordance with the amount of error. As such, separate treatment is required in individual entities, which is a large burden on both the manufacture and usage.

An advantage of some aspects of the invention is to reduce the banding even if impact precision is low.

An aspect of the invention is a print control apparatus configured to cause a droplet ejection device including a head in which a plurality of nozzles are disposed being aligned in a predetermined direction to perform overlap printing in a predetermined region and perform normal printing which does not overlap in another predetermined region. The stated print control apparatus includes a droplet ejection amount control unit configured to change droplet ejection amounts in a region where the overlap printing is performed so that the sum total of the droplet ejection amounts for each raster in the region where the overlap printing is performed sequentially changes to be equal to or greater than a reference amount in a normal region where the overlap printing is not performed and to be equal to or smaller than the above reference amount.

According to the print control apparatus of the above-described configuration that causes the droplet ejection device including a head in which a plurality of nozzles are disposed being aligned in a predetermined direction to perform overlap printing in a predetermined region and perform normal printing which does not overlap in another predetermined region, the sum total of droplet ejection amounts for each raster in the region where the overlap printing is performed sequentially changes to be equal to or greater than the reference amount in the normal region where the overlap printing is not performed and to be equal to or smaller than the above reference amount. In the case where the sum total of droplet ejection amounts is constant, generation of a stripe in the overlap region cannot be avoided when a shift in position of the head is generated in the overlap region. However, in the case where the sum total of droplet ejection amounts sequentially changes to be equal to or greater than the reference amount and to be equal to or smaller than the reference amount, the sum total of droplet ejection amounts itself is not constant so that the stripe is unlikely to be visually recognized.

That is to say, by controlling the sum total of ejection amounts between the heads at a constant period while permitting an error, the banding can be reduced even if the impact precision is low.

BRIEF DESCRIPTION OF THE DRAWINGS

The invention will be described with reference to the accompanying drawings, wherein like numbers reference like elements.

FIG. 8 is a table illustrating a sharing ratio of each nozzle.

FIG. 11 is a table of a comparison example illustrating a sharing ratio of each nozzle.

DESCRIPTION OF EXEMPLARY EMBODIMENTS

Hereinafter, an embodiment of the invention will be described with reference to the drawings.

Figure 1:
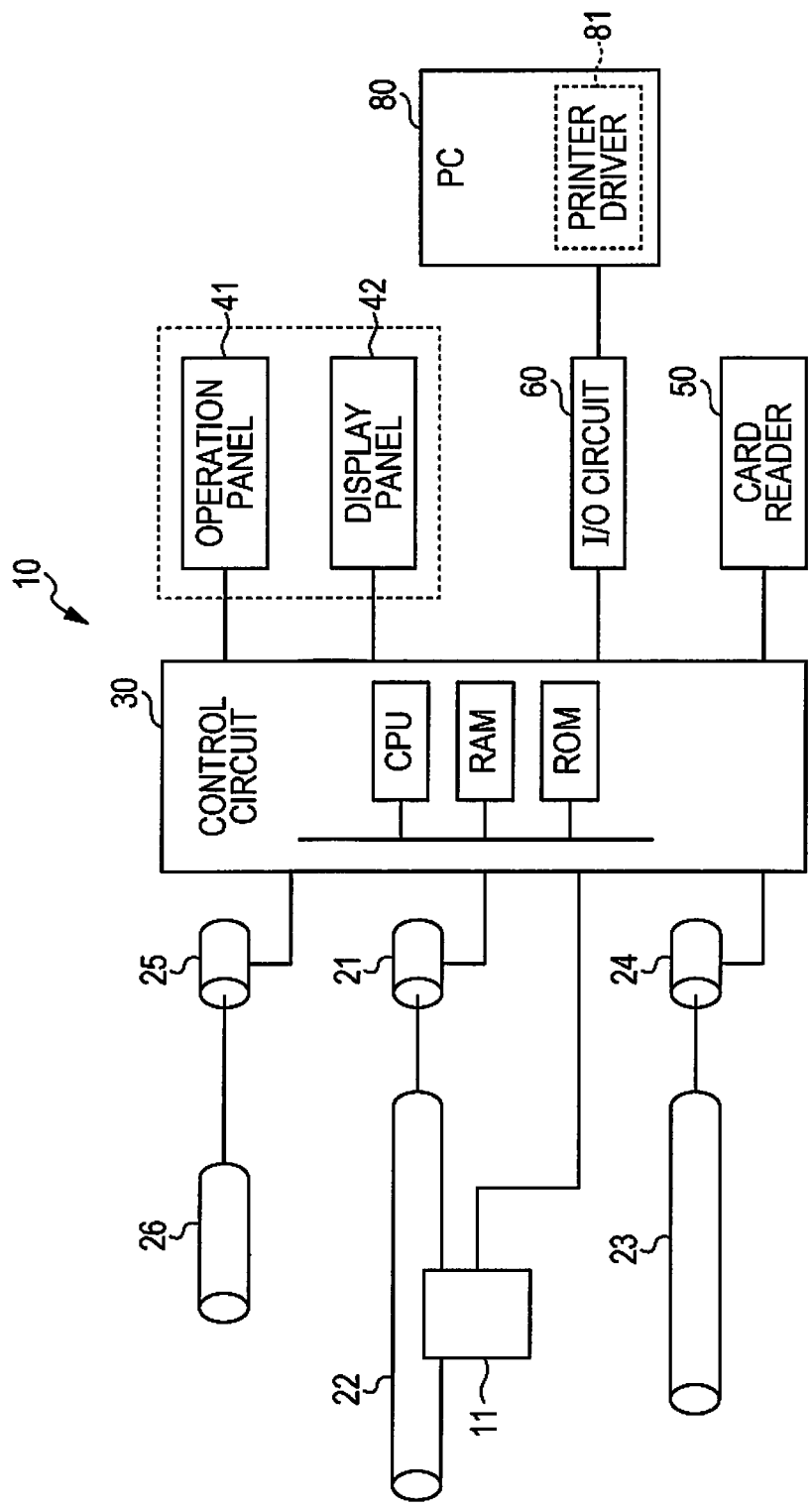
FIG. 1 is a block diagram illustrating a general configuration of a serial printer.

FIG. 1 is a schematic block diagram of an ink jet printer to which the invention is applied.

In FIG. 1, a printing head (head) 11 of a printer (droplet ejection device) 10 ejects color inks of four or six colors, which are supplied from ink tanks, through nozzles. The printing head 11 is so driven as to move back and forth in a predetermined range by a belt 22 driven by a carriage motor 21. A platen 23 is driven by a platen motor 24 and transports paper in response to the reciprocating movement of the printing head 11. A feed motor 25 drives a feed roller 26 for supplying paper that is stored in a predetermined paper stacker. The printer of this type in which the printing head 11 moves back and forth in accordance with the transport of paper in the manner described above, is called a serial printer.

A control circuit 30 is configured by combining dedicated ICs so as to include a CPU, a ROM, and a RAM in terms of functionality. The control circuit 30 controls the driving of the printing head 11, the carriage motor 21, the platen motor 24, and the feed motor 25. An operation panel 41 and a display panel 42 are attached to the control circuit 30. The operation panel 41 receives predetermined operations by a user, and the display panel 42 displays predetermined representations thereon. The above hardware configuration is collectively referred to as a printing mechanism.

A card reader 50 is connected to the control circuit 30, which makes it possible, by mounting an attachable/detachable memory card, to read in the data stored in the memory card, record predetermined data, and so on. Further, an I/O circuit 60 is connected to the control circuit 30, thereby making it possible to connect with other external devices through wire or wireless communications. The control circuit 30 acquires an image data file from the external device, memory card, or the like, and executes printing based on the acquired data file while controlling the above-described constituent elements. Note that the control circuit 30 is connected to an external PC 80 through the I/O circuit 60. The PC 80 generates predetermined print control data using an internal printer driver 81 and sends the generated data to the control circuit 30.

Figure 2:
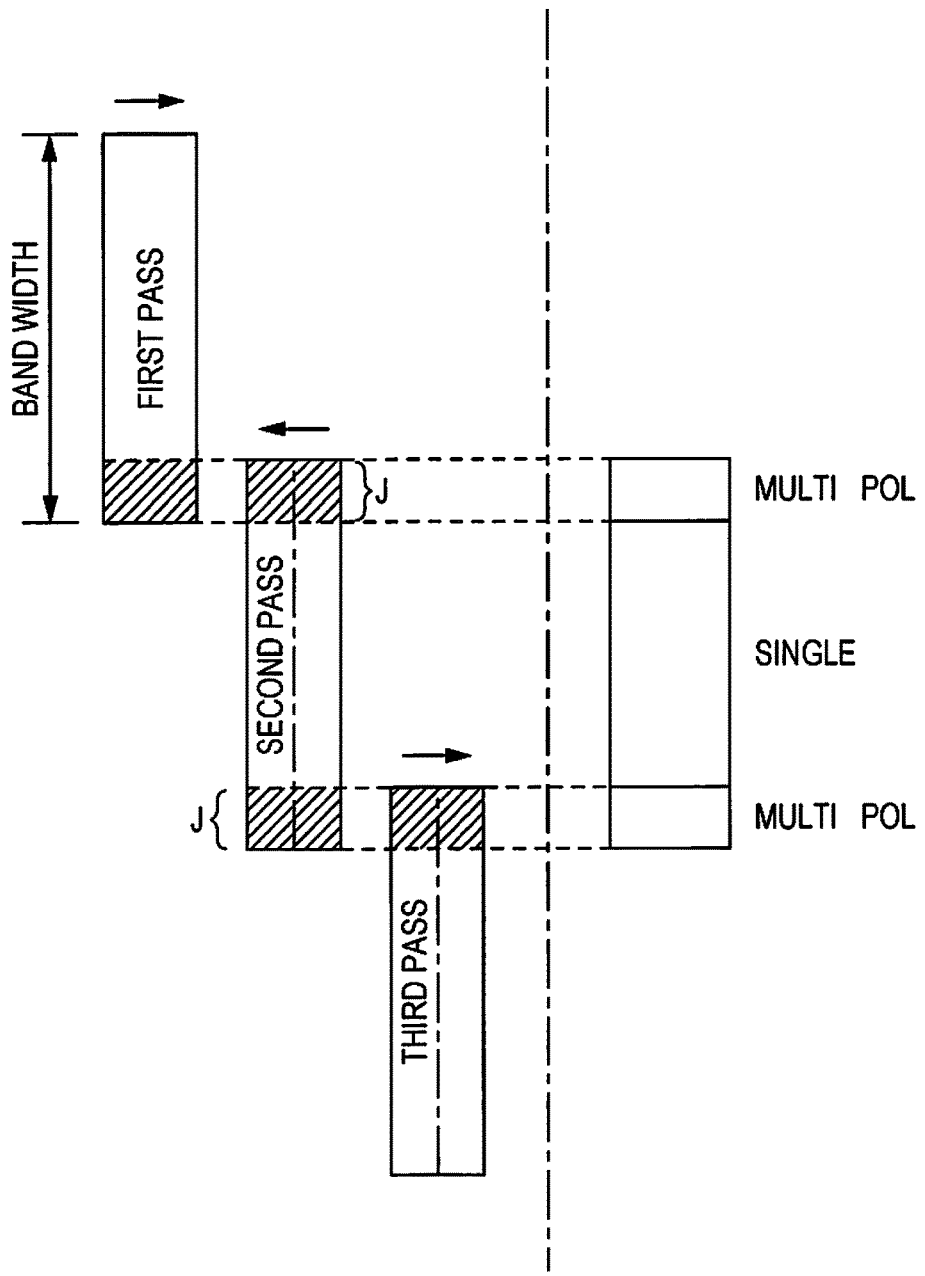
FIG. 2 is a diagram illustrating a region where overlap printing is performed by a serial printer.

FIG. 2 is a diagram illustrating a state of overlap printing.

When printing is performed by making the printing head 11 scan back and forth, there is a case in which a black stripe or a white stripe appears in a portion where print passes overlap with each other.

FIG. 2 illustrates overlapping states of the regions where printing is performed with a nozzle row of the printing head 11 in a first pass in which the printing is performed while the printing head 11 moving from left to right, a second pass in which the printing is performed while the head moving from right to left, and a third pass in which the printing is performed while the head moving from left to right, respectively.

Nozzles are formed in a row pattern in the printing head 11, and a range in which printing can be performed using the nozzles from the first one to the last one is called a band width. In multi-pass printing, the printing is performed using a predetermined number of nozzles on the upstream side and a predetermined number of nozzles on the downstream side of the nozzle row in the printing head 11. In this example, printing is performed in a connection portion J in each print pass, that is, the multi-pass printing is performed in the connection portion J. The region in which the multi-pass printing is performed is referred to as an overlap region POL, and portions other than the overlap region POL are referred to as a normal portion in which single-pass printing is performed. By performing the multi-pass printing in the region to which the predetermined number of nozzles on the upstream side and the predetermined number of nozzles on the downstream side of the nozzle row correspond, the portion where the print passes overlap with each other has a width even if the printing is performed by making the printing head 11 scan back and forth, whereby a black stripe and a white stripe are unlikely to appear. The nozzles may be formed being aligned in a single row or formed being arranged in a zigzag (staggered) pattern. In any case, the nozzles are arranged being aligned in a predetermined direction.

Figure 3:
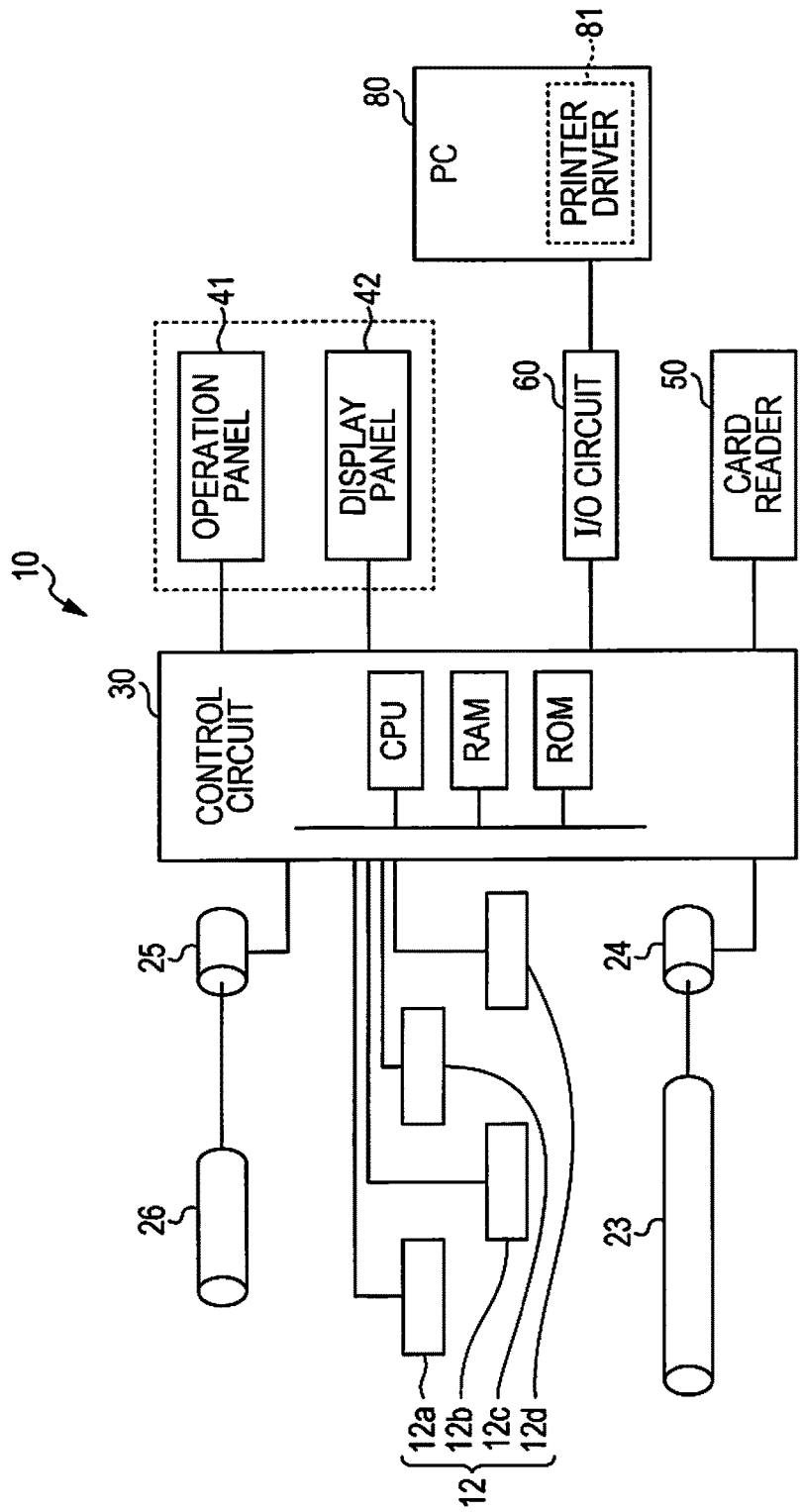
FIG. 3 is a block diagram illustrating a general configuration of a line printer.

FIG. 3 is a schematic block diagram of another ink jet printer to which the invention is applied. This ink jet printer includes printing heads 12a to 12d, and an alignment direction of the nozzle rows is orthogonal to a paper transport direction. The printing heads 12a to 12d are arranged in a zigzag pattern so that end portions of the band widths thereof partially overlap with each other. In comparison with the serial printer shown in FIG. 1, although the carriage motor 21, the belt 22, and the like for moving a printing head 12 are unnecessary, the nozzles are required to be positioned across a width of print paper and a plurality of printing heads 12 are necessary. This type of ink jet printer is also referred to as a line printer.

Figure 4:
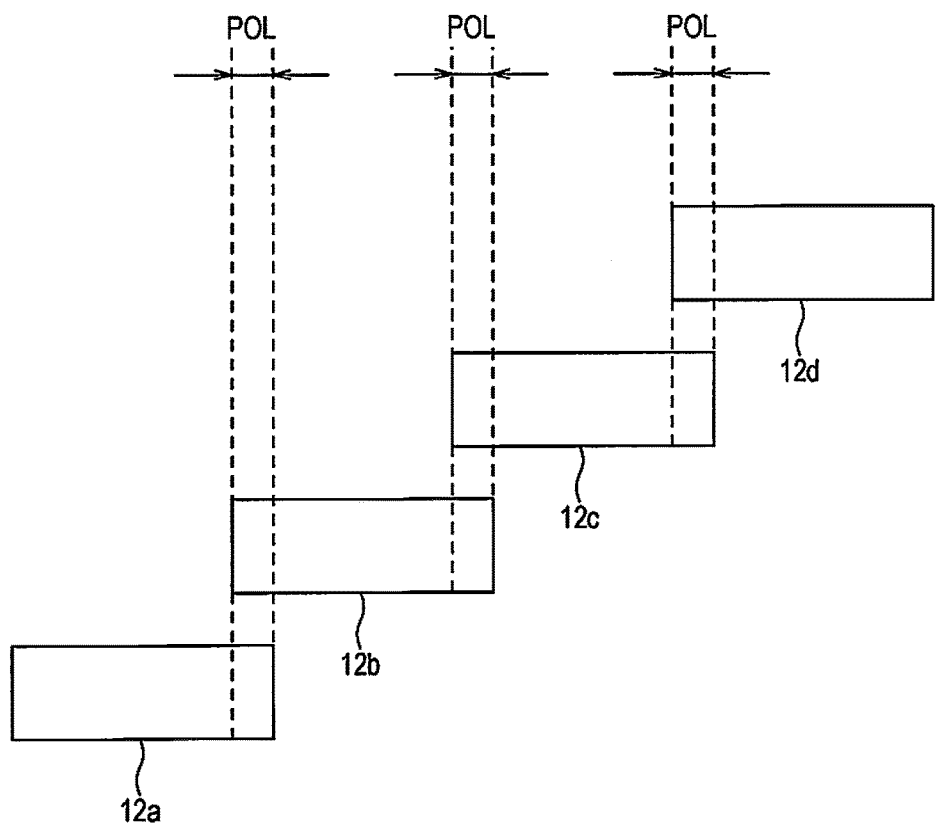
FIG. 4 is a diagram illustrating a region where overlap printing is performed by a line printer.

FIG. 4 is a diagram illustrating a state of overlap printing of the line printer.

Although, in reality, the printing heads 12 are arranged in a zig-zag pattern, they are illustrated in FIG. 4 as being arranged in a step-like pattern so as to facilitate the understanding of overlap printing. In the line printer, the plurality of printing heads 12 are so arranged in advance as to overlap with each other at the end portions of the respective band widths thereof. With this, overlap printing is performed in a portion where the printing heads 12 permanently overlap with each other. As shown in the drawing, each of sections where the printing heads 12 overlap with each other is an overlap region POL. In this example, although the overlap region is generated at the end portion of the band width, a section where the overlap region is generated is not limited to any specific one. As such, an overlap region may be generated in any section. In addition, in the case where multi-pass printing is also performed a plurality of times in the same region in a line printer through the paper transport control, an overlap region is generated in a section where the multi-pass printing is performed.

In the case of a serial printer, the overlap region POL arises due to a shift in position of a raster printed during the two-time scanning of the printing head 11, or the like, which is caused by inappropriate paper transport, a variation in precision of the impact position of droplets ejected by the printing head 11, or the like. Meanwhile, in the case of a line printer, there is generated a shift in position of a raster due to a variation in positioning precision when fixing the printing head 12 in the manufacturing. Because the manufacturing process becomes long in time, special instruments are needed, and so on to raise the positioning precision, a certain level of positioning precision is permitted according to the manufacturing cost. As the positioning precision, an error of an amount equivalent to ± one nozzle, an error of an amount equivalent to ± two nozzles, an error margin of an amount equivalent to ± three nozzles, and the like, can be cited, for example.

Figure 5:
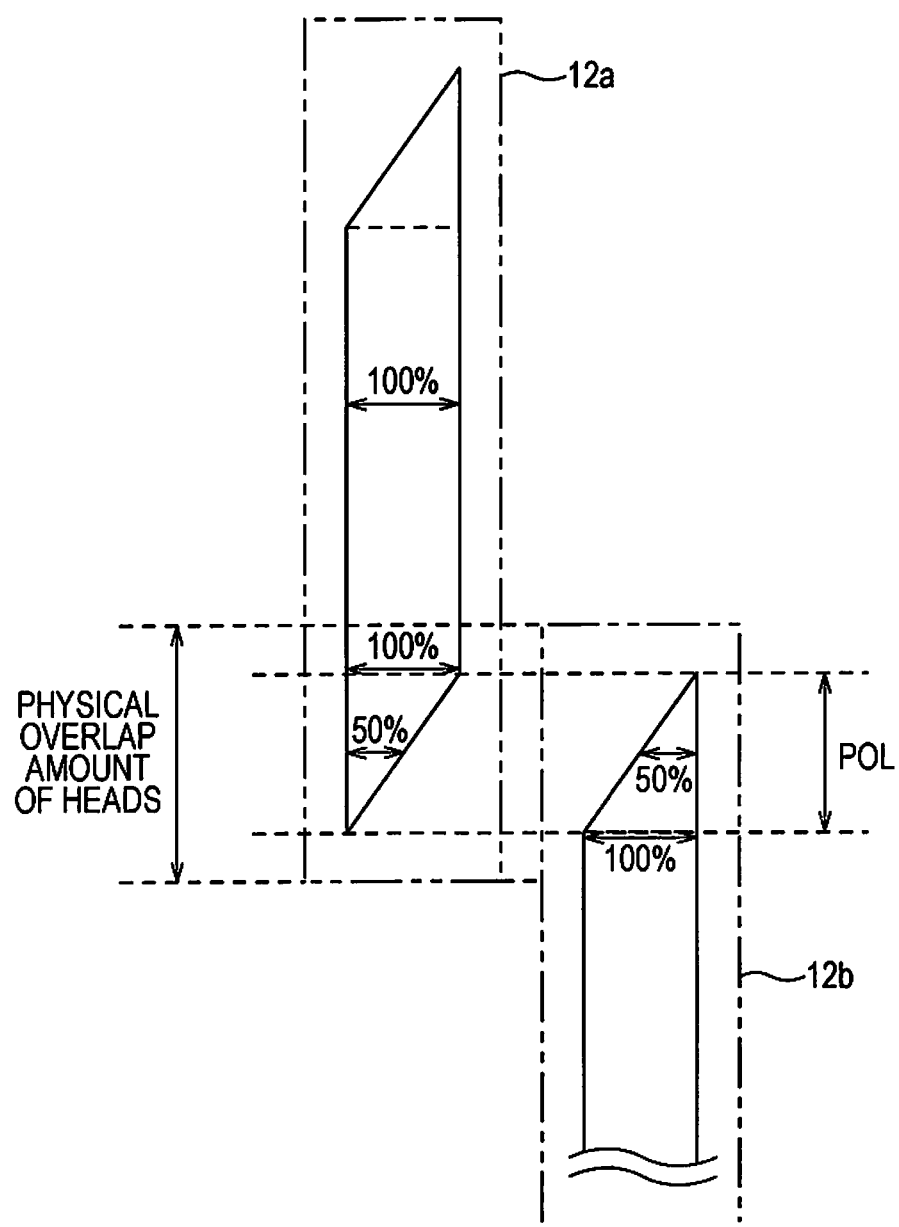
FIG. 5 is a diagram illustrating a sharing ratio of ejection amounts of each head in a region where overlap printing is performed.

FIG. 5 is a diagram illustrating a sharing ratio of ejection amounts of each head in a region where overlap printing is performed.

FIG. 5 illustrates nozzle positions and a data assignment state of the corresponding raster data. Although the same explanation can be given to a serial printer or a line printer, the description will be given taking a line printer as an example for the sake of convenience. A double-dot dash line indicates a physical position of the printing head 12; as shown in the drawing, for example, two printing heads 12a and 12*b* overlap with each other at end portions of the band widths. Although a length of the nozzle row is shorter than a length of the physical printing head 12, the overlap region POL is generated by the printing heads 12 partially overlapping with each other. In a case where raster data in the overlap region is printed by both the printing heads 12, the printing is performed in a duplicate mode. This state is expressed as a "droplet ejection amount is 200%". In a case where the printing is performed by only one of the printing heads 12, the droplet ejection amount is 100%. However, this is not a state of overlap printing. As such, operation of printing the raster data is shared between the printing heads 12*a* and 12*b*. Note that the droplet ejection amount is 100% in a normal portion, which is not an overlap region.

In this case, it is assumed that the droplet ejection amount is shared between the printing heads 12*a* and 12*b* by 50% each. Because of the above-mentioned problem of positioning precision, the printing heads 12*a* and 12*b* may be possibly shifted from the original positions by an amount equivalent to one to three nozzles. Accordingly, if the heads are shifted in a direction being distanced by an amount equivalent to two nozzles, two nozzles' worth of raster data extending from a nozzle from which the overlap region starts is not overlap-printed by the other printing head, thereby causing the droplet ejection amount to be 50%. This lowers the density and raises a risk that the raster data is visually recognized as a so-called white stripe.

As such, in this embodiment, a sharing ratio of raster data in the two printing heads is gradually changed in the overlap region. That is, the droplet ejection amount is gradually reduced from 100% to 0% in a range from a nozzle where the overlap region starts to a nozzle positioned at the end portion of the nozzle row. The sharing ratio is gradually reduced in both the printing heads 12*a* and 12*b* under the same rule. In other words, in a region where the overlap printing is performed, the droplet ejection amount of each head is gradually reduced as it progresses toward an end of the nozzle. By doing so, the sum total of the droplet ejection amounts from end to end in the overlap region becomes substantially 100%.

As discussed above, if the printing heads 12*a* and 12*b* are shifted in a direction being distanced by an amount equivalent to two nozzles, although two nozzles' worth of raster data extending from a nozzle from which the overlap region starts is not overlap-printed by the other printing head, the resultant droplet ejection amount is an ejection amount that is slightly reduced from 100%. Because of this, a situation where the density is rapidly lowered and a so-called white stripe is visually recognized is prevented from occurring.

Meanwhile, in this case, if the ejection amount of the third nozzle is 98%, the sum total of the droplet ejection amounts by the printing heads 12*a* and 12*b* in the overlap region becomes substantially 98% across the whole region. That is, although not rapidly lowered in the portion of the two nozzles, the sum total of the droplet ejection amounts becomes 98% as a whole, which raises a risk of a stripe being visually recognized.

As such, in the case where an overlap region is generated in some area, that is, in the case where overlap printing is performed in a predetermined region and normal printing which does not overlap is performed in another predetermined region, this invention is applied. According to the embodiment of the invention, droplet ejection amounts in a region where the overlap printing is performed are changed so that the sum total of the droplet ejection amounts for each raster sequentially changes to be equal to or greater than a reference amount in a normal region where overlap printing is not performed and to be equal to or smaller than the above reference amount.

The control of the droplet ejection amounts can be realized by changing the sharing ratio of raster data. Subsequently, a generation process of the raster data will be described below.

Figure 6:
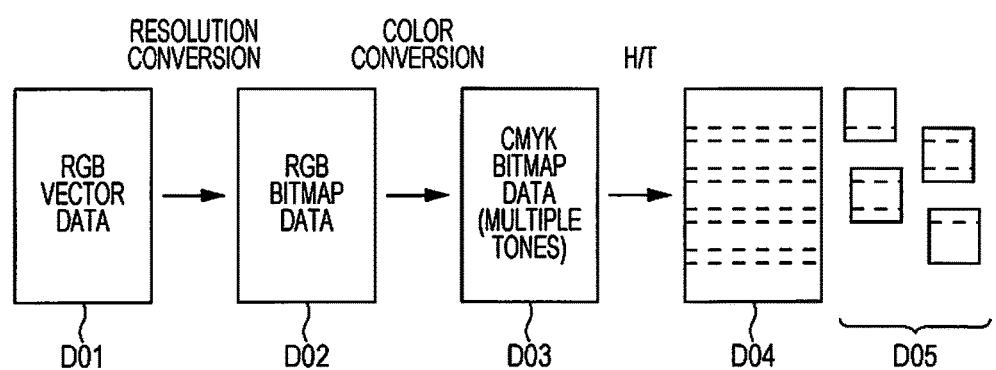
FIG. 6 is a diagram illustrating an example of data conversion.

FIG. 6 is a diagram illustrating an example of data conversion.

In the case where printing is performed by a PC, an application of the PC generally handles RGB multiple-tone data. Although vector data, bitmap data, and the like can be handled, vector data D01 is taken as an example herein. In the print process, first of all, the vector data D01 is converted to RGB multiple-tone bitmap data D02 corresponding to the printer resolution. This is referred to as a resolution conversion.

Although various kinds of inks such as inks of four colors or inks of six colors are mounted in the printer, inks of four colors of CMYK are taken as an example of the inks mounted herein. The RGB multiple-tone bitmap data D02 is converted to CMYK multiple-tone bitmap data D03 corresponding to the ink colors of the printer. This is referred to as a color conversion. The color conversion is carried out while referring to a color conversion lookup table. After the color conversion, although the bitmap data D03 corresponds to the ink colors, it is still in the form of multiple tones. Accordingly, halftone processing is carried out in which the multiple-tone data is converted to binary data representing whether or not to eject a droplet, or to multivalued data formed of two bits or so additionally corresponding to size of the droplet. With this, the bitmap data D03 is converted to raster data D04 corresponding to the respective nozzles.

Being raster data and corresponding to the respective nozzles of the printing heads 12, the raster data D04 can be formed in raster data D05 in which the raster data D04 is divided into pieces of data corresponding to each of the printing heads 12 while including the overlap regions. At this time, with regard to the overlap regions, the raster data is assigned to each of the printing heads within a range of the droplet ejection amount. Because the droplet ejection amounts are shared between the printing heads, in the case where the raster data D05 assigned to one of the printing heads 12 is not assigned to the other of the printing heads 12, the sum total of the droplet ejection amounts becomes 100%. Because it is not absolutely necessary for the sum total to be 100%, in the case where the sharing ratio is set so that the sum total exceeds 100%, droplets will be ejected from both the printing heads 12 for a certain dot.

Figure 7:
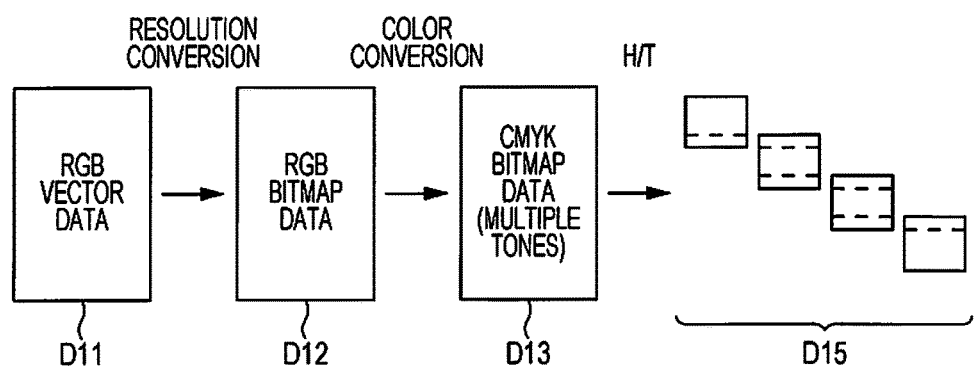
FIG. 7 is a diagram illustrating another example of data conversion.

FIG. 7 is a diagram illustrating another example of data conversion.

In this example, such raster data is prepared in the halftone processing that is divided into pieces of data corresponding to each of the printing heads 12. As such, RGB vector data D11 handled by the application is converted to RGB multiple-tone bitmap data D12 through the resolution conversion; the bitmap data D12 is converted to CMYK multiple-tone bitmap data D13 through the color conversion; and then raster data D15 to be assigned to each of the printing heads 12 is generated by the halftone processing. In the halftone processing, with regard to the overlap regions, the raster data is assigned to each of the printing heads within a range of the droplet ejection amount.

In this embodiment, the droplet ejection amounts are adjusted in the processes of generating the raster data D05 and raster data D15, and a constituent element that realizes the processes of generating the raster data D05 and raster data D15 corresponds to a droplet ejection amount control unit. The control circuit 30 realizes the above-mentioned processes. In addition, an external PC can generate and supply raster data to the control circuit 30; in this case, the printer driver 81 of the PC 80 corresponds to the droplet ejection amount control unit. The above-discussed constituent elements collectively correspond to a droplet ejection control apparatus, the processes carried out therein correspond to a droplet ejection control method, and a program configured to realize the above-mentioned functions corresponds to a droplet ejection control program.

Figure 9:
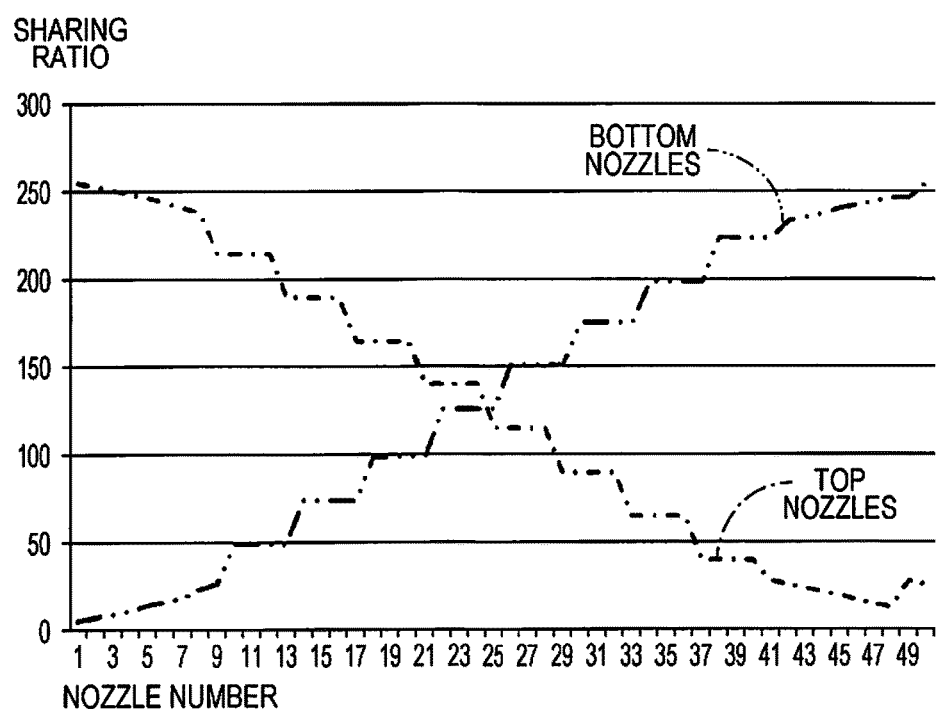
FIG. 9 is a graph illustrating a sharing ratio of each nozzle.

Next, FIG. 8 is a table illustrating a sharing ratio of each nozzle, and FIG. 9 is a graph illustrating a sharing ratio of each nozzle.

In FIG. 8, respectively illustrated are, from left to right, a nozzle number, a sharing ratio of a top nozzle, a sharing ratio of a bottom nozzle, a sum total of droplet ejection amounts in the case of no position shift, a sum total of droplet ejection amounts in the case where a position shift being distanced by an amount equivalent to one nozzle is generated, and a sum total of droplet ejection amounts in the case where a position shift coming closer by an amount equivalent to one nozzle is generated.

The nozzle number indicates each individual nozzle sharing the overlap region, and in this example, 50 nozzles are assigned to the overlap region. Nozzles at end portions of two printing heads 12a, 12b are assigned to the overlap region; the nozzles of one of the printing heads 12 are called top nozzles, while the nozzles of the other of the printing heads 12 are called bottom nozzles. As for the top nozzles, they are respectively numbered so that the nozzle number gradually becomes larger as it progresses from the normal portion toward the end portion; meanwhile, as for the bottom nozzles, they are respectively numbered so that the nozzle number gradually becomes smaller as it progresses from the normal portion toward the end portion.

Numeric values indicating the sharing ratios are 0 to 255. The value "255" represents 100%, while the value "0" represents 0%.

The sharing ratio of the top nozzle of the nozzle number "1" is "255", which means 100%. Meanwhile, the sharing ratio of the bottom nozzle is "5", which represents 1.9608% when some of the significant digits are ignored. Accordingly, the sum total of droplet ejection amounts in the case of no position shift (0 μm) is 101.9608 (100+1.9608)%. Next, in the case where a position shift being distanced by an amount equivalent to one nozzle (42 μm) is generated, the sum total of droplet ejection amounts is 100% because the droplet ejected by the bottom nozzle does not overlap. In contrast, in the case where a position shift coming closer by an amount equivalent to one nozzle (42 μm) is generated, the sum total of droplet ejection amounts is 101.9608 (100+1.9608)% because the sharing ratio of the bottom nozzle of the nozzle number "2" is also "5" representing 1.09608%.

It can be understood from the table that the sharing ratio of the top nozzles of the nozzle numbers "1" to "48" decreases with uniformity. Although only those of the nozzle numbers "49" and "50" are different from the above tendency, the values thereof are adjusted ones. Meanwhile, it can be understood that the sharing ratio of the bottom nozzles of the nozzle numbers "1" to "50" increases with uniformity.

Both the top nozzles and the bottom nozzles have a constant value every four nozzles in a certain range. Four nozzles of the top nozzles from the nozzle number "9" have a constant value, and then the sharing ratio gradually decreases while periodically taking a constant value. Meanwhile, four nozzles of the bottom nozzles from the nozzle number "10" have a constant value, and then the sharing ratio gradually increases while periodically taking a constant value. FIG. 9 illustrates the above-discussed sharing ratios in a graph, where a dot-dash line corresponds to the sharing ratio of the top nozzles while a double-dot dash line corresponds to the sharing ratio of the bottom nozzles. The graph clearly illustrates a state where each of the sharing ratios gradually increases or decreases in a step-like pattern while maintaining a constant value at a certain period.

While each of the sharing ratios of the top nozzles and the bottom nozzles periodically increases or decreases every four nozzles in the same manner, the starting nozzle number of the four nozzles is shifted by an amount equivalent to one nozzle.

With this, the top and bottom nozzles respectively maintain a constant value at three nozzles, and the nozzle that is not included in the above three nozzles is combined with another nozzle in a state where one side of the nozzles increases in value or a state where the other side of the nozzles decreases in value. As a result, the sum total of droplet ejection amounts of the three nozzles exceeds 100% while the sum total of droplet ejection amounts of the one nozzle becomes below 100%. This is repeated from the nozzle number "9" through the nozzle number "41".

The sum total of droplet ejection amounts is 100% in a normal portion. As such, in the case where this sum total is taken as a reference amount, droplet ejection amounts for each raster in a region where the overlap printing is performed are changed so that the sum total of the droplet ejection amounts for each raster in the region where the overlap printing is performed sequentially changes to be equal to or greater than the reference amount defined by the sum total of droplet ejection amounts in the normal region, and to be equal to or smaller than the above reference amount.

In this embodiment, the sum total of droplet ejection amounts for each raster in the region where the overlap printing is performed is so changed as to be periodically no less than the reference amount and no more than the reference amount on a period of every four nozzles or the like as discussed above.

Further, the above-mentioned starting nozzle is shifted in position by one nozzle while the nozzles being shifted every four nozzles. With this, the droplet ejection amount is changed at a period of a predetermined number of nozzles in a region where the overlap printing is performed so that the droplet ejection amount is equal to or greater than the reference amount at the majority of the nozzles, that is, three nozzles, and so that it is equal to or smaller than the reference amount at less than half the nozzles, that is, one nozzle.

The sum total of droplet ejection amounts, when the sharing ratio of the raster data of each of the printing heads 12 is changed as discussed above, is graphed in FIG. 10.

Figure 10:
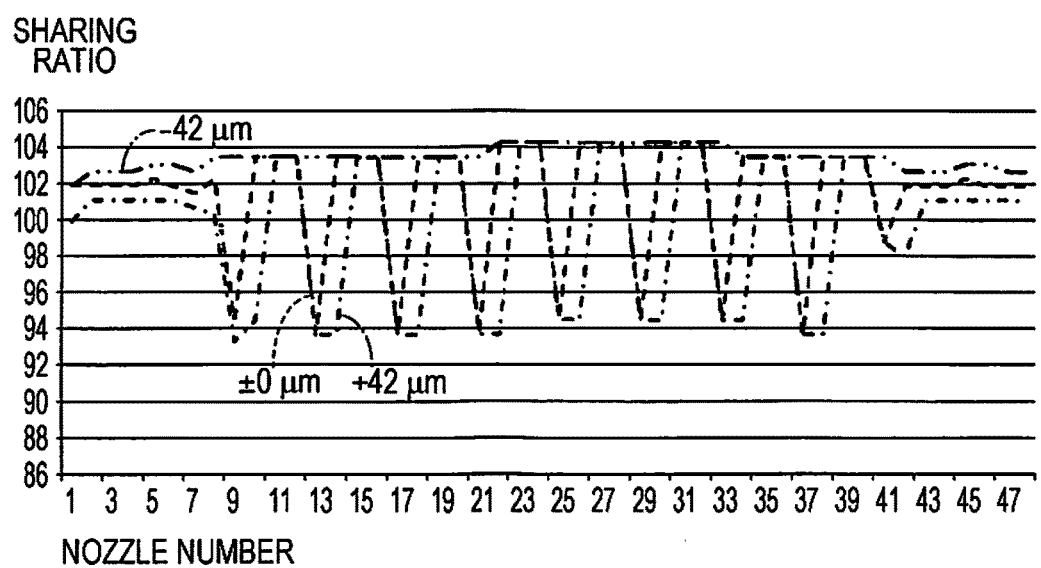
FIG. 10 is a graph illustrating a sum total of ejection amounts of each nozzle.

FIG. 10 is a graph illustrating the sum total of ejection amounts of each nozzle.

As for the sum total of droplet ejection amounts (broken line) in the case of no position shift (0 μm), it is repeated that, excluding the regions at both ends, the sum total exceeds 100% at three nozzles while the sum total is below 100% at one nozzle. As for the sum total of droplet ejection amounts (dot-dash line) in the case where a position shift being distanced by an amount equivalent to one nozzle (42 μm) is generated, it is repeated that the sum total exceeds 100% at two nozzles while the sum total is below 100% at another two nozzles. Further, as for the sum total of droplet ejection amounts (double-dot dash line) in the case where a position shift coming closer by an amount equivalent to one nozzle (42 μm) is generated, the sum total overall exceeds 100%, and, in particular, forms a curve line so as to depict a slightly mountain-like shape in a portion of the overlap region excluding both ends thereof.

As in the example of no position shift, when it is repeated that the sum total exceeds 100% at the three nozzles while the sum total is below 100% at the one nozzle, a person cannot visually recognize presence of a slur and can visually recognize that no substantial change is present through the observation by the person. Meanwhile, because the overall sum total is not below 100%, it is not recognizable by the person that the density of the overall overlap region is lowered. This makes it possible to explain, substantially in the same manner, the case of a position shift being distanced by an amount equivalent to one nozzle.

Meanwhile, the sum total overall exceeds 100% in the case where a position shift coming closer by one nozzle (42 μm) is generated. In particular, the sum total depicts a slightly mountain-like shape in a portion of the overlap region excluding both the sides thereof. However, when the overlap printing is performed in the manner discussed above, the overall density is likely to be lowered. As such, the sum total of droplet ejection amounts slightly exceeding 100% does not give a feeling that the density of the overlap region is increased, but results in maintaining the density of the normal portion. Consequently, any problematic situation is found in any of the following cases: that is, a case of no position shift, a case of a position shift being distanced by an amount equivalent to one nozzle, and a case of a position shift coming closer by an amount equivalent to one nozzle.

Figure 12:
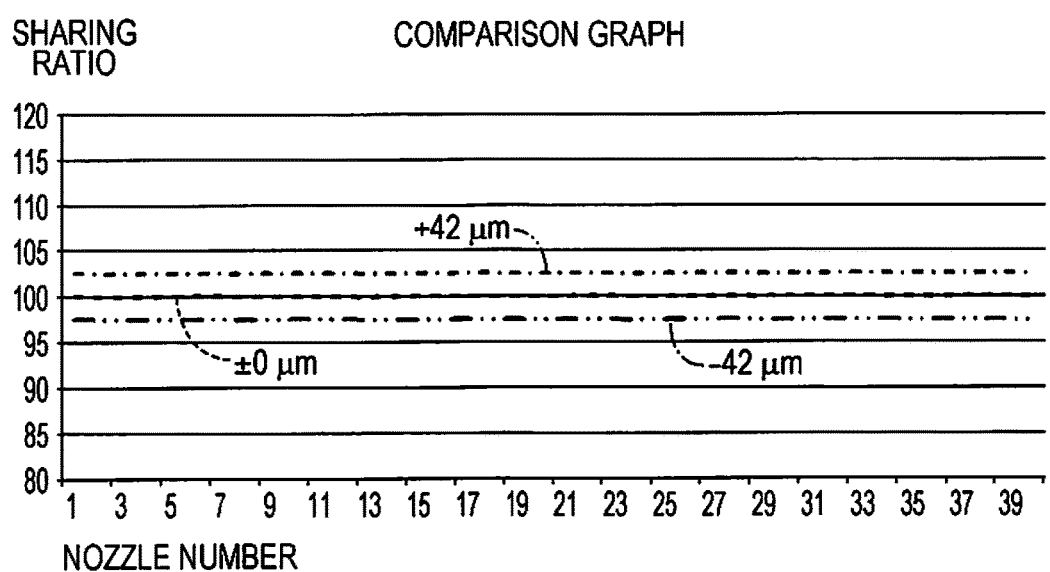
FIG. 12 is a graph of a comparison example illustrating a sum total of ejection amounts of each nozzle.

FIG. 11 is a table of a comparison example illustrating a sharing ratio of each nozzle, and FIG. 12 is a graph of the comparison example illustrating the sum total of ejection amounts of each nozzle.

In this comparison example, the sharing ratio is sequentially decreased substantially by a constant value in the top nozzles, while the sharing ratio in the bottom nozzles is sequentially changed by a value increased by the degree that is reverse to the degree of decreasing in the top nozzles. The sum total of droplet ejection amounts of the top and bottom nozzles is 100% in the case of no position shift, 97.5% in the case of a position shift being distanced by an amount equivalent to one nozzle, and 102.5% in the case of a position shift coming closer by an amount equivalent to one nozzle.

The above-mentioned table is graphed in FIG. 12. In the case where a position shift is generated, the sum total of droplet ejection amounts becomes below 100% or exceeds 100% in substantially all the nozzles. Such a low rate change is likely to be visually recognized, which means that a decrease and an increase in the density of the overall overlap region can be visually recognized.

In the above embodiment, the sharing ratio is repeatedly changed in a step-like manner while taking every four nozzles as one period. The following description is focused on the sections that are periodically changed.

Figure 13:
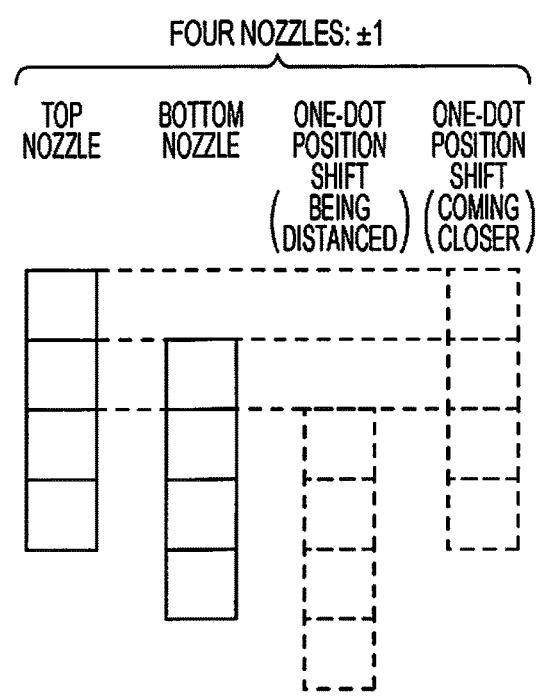
FIG. 13 is a diagram illustrating position shifts of a head with four nozzles.

FIG. 13 is a diagram illustrating position shifts of a head with four nozzles. In the drawing, a nozzle position of the top nozzles of one period is illustrated at the leftmost side, a nozzle position of the bottom nozzles of one period with no position shift is illustrated next, a nozzle position of the bottom nozzles of one period with a position shift generated being distanced by one dot is subsequently illustrated, and a nozzle position of the bottom nozzles of one period with a position shift generated coming closer by one dot is illustrated at the rightmost side.

In the case where no position shift is generated, a shift by an amount equivalent to one nozzle is maintained, a constant value exceeding 100% is obtained at three nozzles, and a constant value below 100% is obtained at one nozzle. In the case of a shift coming closer by one nozzle, the periods match each other and a constant value exceeding 100% is obtained. In the case of a shift being distanced by one nozzle, a constant value exceeding 100% is obtained at two nozzles, and a constant value below 100% is obtained at another two nozzles.

In the case where it is targeted to maintain an expected range of overlap at half the nozzles in a four-nozzle period so as to prevent influence of a position shift even if the position shift being distanced by an amount equivalent to one nozzle is generated, a period of four nozzles is necessary under the environment where an error of an amount equivalent to ±one nozzle can be generated.

Figure 14:
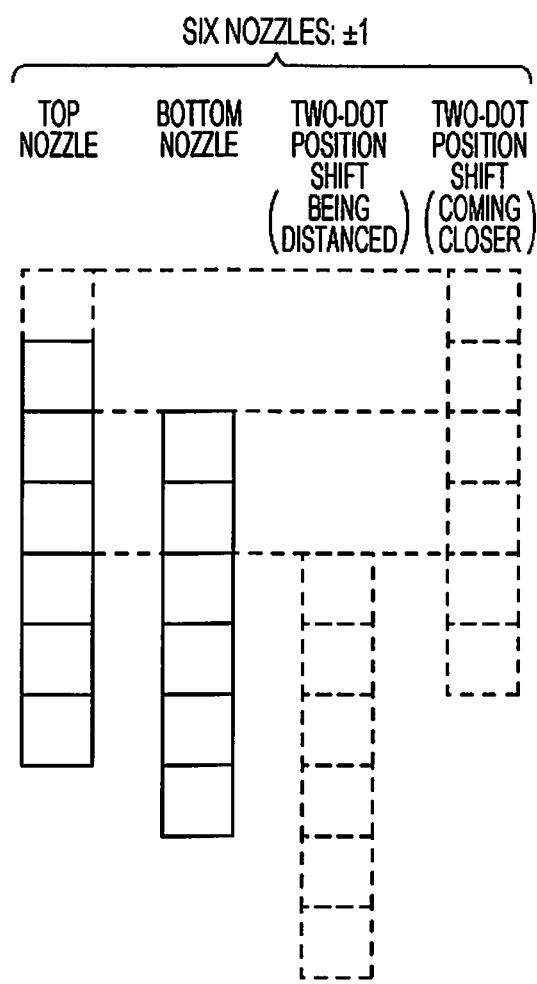
FIG. 14 is a diagram illustrating position shifts of a head with six nozzles.

Next, FIG. 14 is a diagram illustrating position shifts of a head with six nozzles. In the drawing, a nozzle position of the top nozzles of one period is illustrated at the leftmost side, a nozzle position of the bottom nozzles of one period with no position shift is illustrated next, a nozzle position of the bottom nozzles of one period with a position shift generated being distanced by two dots is subsequently illustrated, and a nozzle position of the bottom nozzles of one period with a position shift generated coming closer by two dots is illustrated at the rightmost side.

In the case of the six nozzles, when a shift by an amount equivalent to one nozzle without the generation of a position shift is taken as an original shift, an expected range of overlap can be maintained at half the nozzles in a period until being distanced by two nozzles. To rephrase, in the case where a position shift being distanced by two nozzles is generated, a planned sum total of droplet ejection amounts is maintained in three nozzles among the six nozzles. In other words, a period of six nozzles is necessary under the environment where an error of an amount equivalent to ± two nozzles can be generated. Note that in the case where a position shift coming closer by two nozzles is generated, because a planned sum total of droplet ejection amounts is maintained in five nozzles among the six nozzles, the overlap range is also maintained without any problem in this case.

Figure 15:
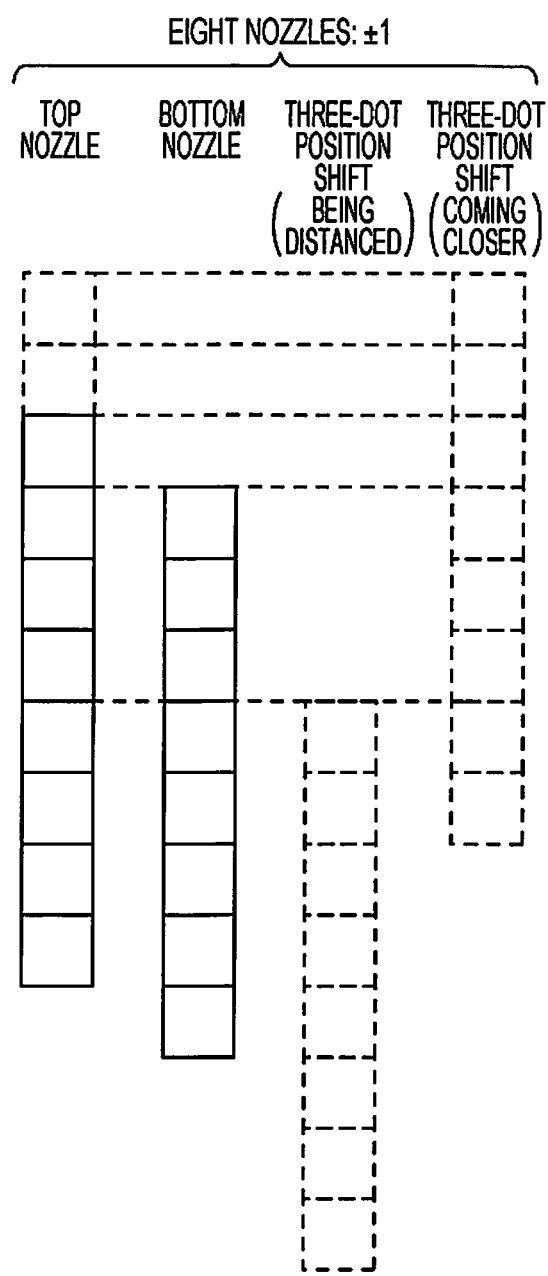
FIG. 15 is a diagram illustrating position shifts of a head with eight nozzles.

FIG. 15 is a diagram illustrating position shifts of a head with eight nozzles. In the drawing, a nozzle position of the top nozzles of one period is illustrated at the leftmost side, a nozzle position of the bottom nozzles of one period with no position shift is illustrated next, a nozzle position of the bottom nozzles of one period with a position shift generated being distanced by three dots is subsequently illustrated, and a nozzle position of the bottom nozzles of one period with a position shift generated coming closer by three dots is illustrated at the rightmost side.

In the case of the eight nozzles, when a shift by an amount equivalent to one nozzle without the generation of a position shift is taken as an original shift, an expected range of overlap can be maintained at half the nozzles in a period until being distanced by three nozzles. To rephrase, in the case where a position shift being distanced by three nozzles is generated, a planned sum total of droplet ejection amounts is maintained in four nozzles among the eight nozzles. In other words, a period of eight nozzles is necessary under the environment where an error of an amount equivalent to ±three nozzles can be generated. Note that in the case where a position shift coming closer by three nozzles is generated, because a planned sum total of droplet ejection amounts is maintained in six nozzles among the eight nozzles, the overlap range is also maintained without any problem in this case.

As discussed above, in the case where an error range of position shift is represented by the number of nozzles, it can be understood that the period consequently corresponds to even numbers of nozzles. In other words, it is sufficient to change the droplet ejection amounts at a period of even numbers of nozzles in a region where the overlap printing is performed.

In order to generate the above-discussed sum total of droplet ejection amounts, mask processing is applied so that the processing can be applied to a constant area. For example, a process in which threshold values are arranged in a random mode, like a dither mask, so as to turned on or off each dot based on comparison with the threshold values can be cited. Alternatively, the sharing ratio may be accurately realized by carrying out arithmetic operation like the error variance.

In the above example, in the case of the four-nozzle period, the sharing ratio of the four nozzles is set to a constant value; however, the sharing ratio of the four nozzles may not be set to a constant value, but a change within a certain range can be permitted. In such a case, a change can also be increased or decreased not only in a gradually changing pattern but also in a randomly changing pattern within a certain range. The expression "to periodically change" includes these changes as well.

In the overlap region, there is a risk that color is changed to be different from that in the normal region depending on the order of ejection of color inks.

Figure 16:
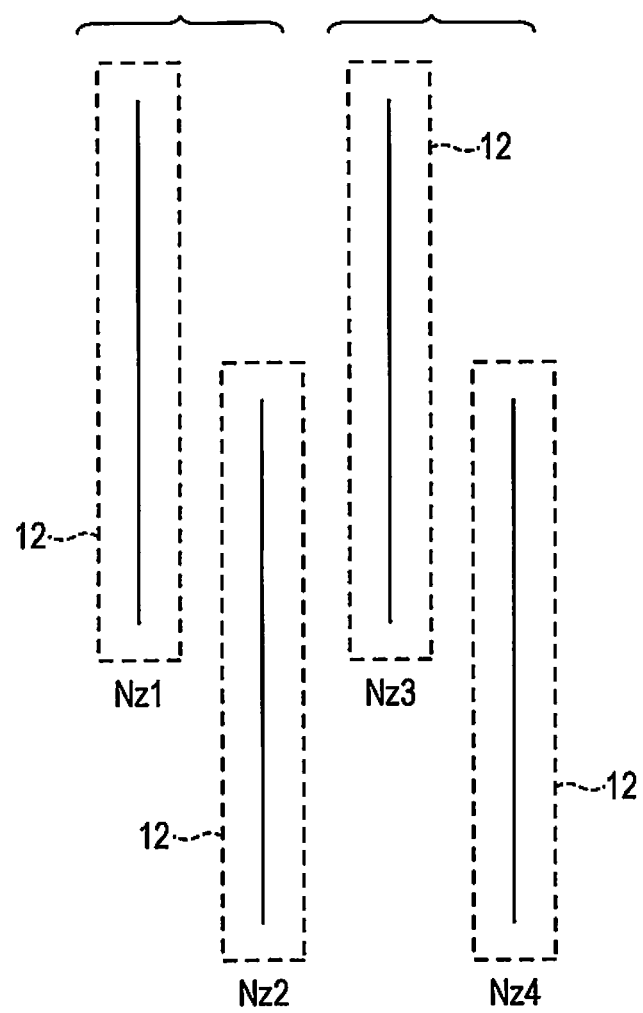
FIG. 16 is a diagram illustrating an example of arrangement of nozzle rows intended to prevent generation of color change in an overlap region.

FIG. 16 is a diagram illustrating an example of arrangement of nozzle rows intended to prevent generation of color change in an overlap region.

In FIG. 16, it is assumed that four printing heads 12 are aligned in parallel in a paper transport direction. Of nozzle rows NZ1 to NZ4, the nozzle rows NZ1 and NZ2 are supplied with the same color ink, while the nozzle rows NZ3 and NZ4 are supplied with a different color ink from the nozzle rows NZ1 and NZ2; note that the same color ink is supplied to the nozzle rows NZ3 and NZ4. With this arrangement, in a region where overlap printing is performed, overlap printing is performed with the nozzle rows NZ1 and NZ2 of the same color, and thereafter another overlap printing can be performed with the nozzle rows NZ3 and NZ4 of the different color. Accordingly, a difference in color from the normal region is unlikely to be generated.

Figure 17:
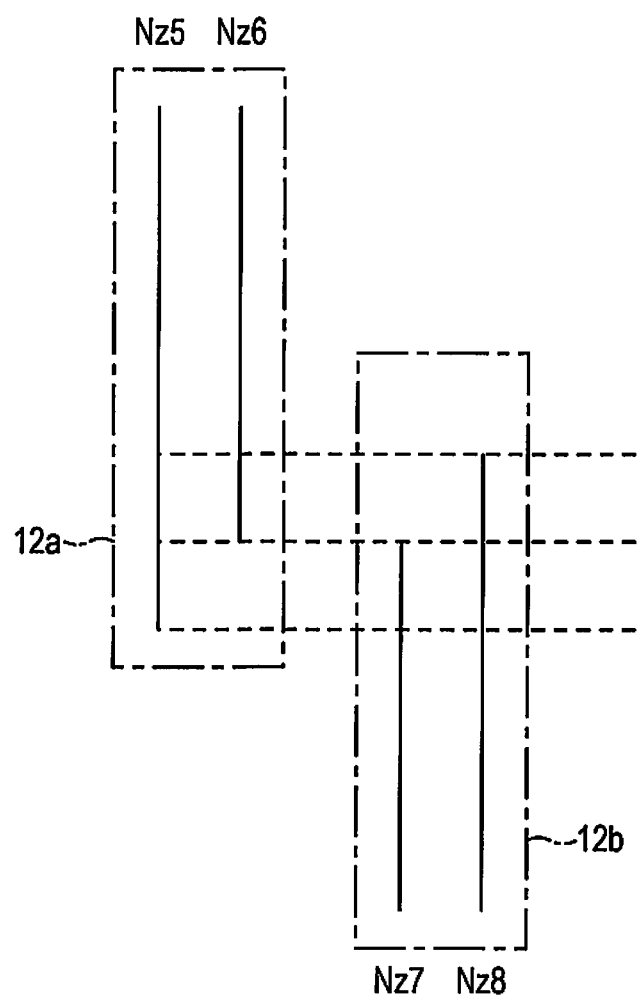
FIG. 17 is a diagram illustrating another example of arrangement of nozzle rows intended to prevent generation of color change in an overlap region.

FIG. 17 is a diagram illustrating another example of arrangement of nozzle rows intended to prevent generation of color change in the overlap region.

Even in the case where a plurality of nozzle rows are provided in the printing head 12, it is also possible to prevent a change in color from being generated by restricting the nozzle rows to use and changing a position of the overlap region.

Two printing heads 12 include at least two nozzle rows each, and are aligned in parallel in the paper transport direction. Of nozzle rows NZ5 to NZ8, the nozzle rows NZ5 and NZ7 are supplied with the same color ink, while the nozzle rows NZ6 and NZ8 are supplied with a different color ink from the nozzle rows NZ5 and NZ7; note that the same color ink is supplied to the nozzle rows NZ6 and NZ8. In the nozzle row NZ6, 50 nozzles at the lowermost end are not used; in the nozzle row NZ7, 50 nozzles at the uppermost end are not used; and two printing heads 12a and 12b are so disposed as to make 100 nozzles overlap each other. An overlap region is generated at a position shifted by 50 nozzles in each color ink. Even if the order of two color inks being ejected onto paper is nested like the order of the nozzle rows NZ5, NZ6, NZ7, and NZ8, the respective color inks are superimposed in sequence because the overlap regions are not overlapped each other. As a result, a difference in color from the normal region is unlikely to be generated also in the overlap region.

As discussed above, in a region where overlap printing is performed with nozzles, overlap printing with the nozzles ejecting the same color ink is performed, and thereafter another overlap printing with the nozzles ejecting a different color ink is performed.

It is needless to say that the invention is not limited to the above embodiments. It goes without saying, for those skilled in the art, that the following are included as embodiments of the invention:

the invention is applied in a manner in which the combinations of the members, configurations, and so on that are disclosed in the aforementioned embodiments are capable of being replaced with each other and appropriately changed.

the invention is applied in a manner in which members, configurations, and so on, although not disclosed in the aforementioned embodiments, that are known techniques and can replace or can be replaced with the members, configurations, and so on disclosed in the aforementioned embodiments, are appropriately employed for the replacement, and the combination thereof is changed.

the invention is applied in a manner in which members, configurations, and so on, although not disclosed in the aforementioned embodiments, that can be considered, by those skilled in the art based on the known techniques and the like, to be capable of being used as substitutes for the members, configurations, and so on disclosed in the aforementioned embodiments, are appropriately employed for the replacement, and the combination thereof is changed.

This application claims priority under 35 U.S.C. § 119 to Japanese Patent Application No. 2016-038648, filed Mar. 1, 2016. The entire disclosure of Japanese Patent Application No. 2016-038648 is hereby incorporated herein by reference.

What is claimed is:

1. A droplet ejection control apparatus configured to cause a droplet ejection device including a head in which a plurality of nozzles are disposed being aligned in a predetermined direction to perform overlap printing in a predetermined region and perform normal printing which does not overlap in another predetermined region, the droplet ejection control apparatus comprising:

a droplet ejection amount control unit configured to change droplet ejection amounts for each raster in a region where the overlap printing is performed so that a sum total of the droplet ejection amounts for each raster in the region where the overlap printing is performed sequentially changes to be an amount equal to or greater than a reference amount that is defined by a sum total of droplet ejection amounts in a normal region and to be an amount smaller than the reference amount.

2. The droplet ejection control apparatus according to claim 1, wherein the droplet ejection amount control unit causes a droplet ejection amount of each head to gradually decrease as it progresses toward an end of the nozzle in a region where overlap printing is performed.

3. The droplet ejection control apparatus according to claim 1,
wherein the droplet ejection amount control unit causes an ejection amount in the normal region to be substantially 100%.

4. The droplet ejection control apparatus according to claim 1,
wherein the droplet ejection amount control unit causes the sum total of droplet ejection amounts for each raster in a region where overlap printing is performed to periodically change to be equal to or greater than the reference amount and to be equal to or smaller than the reference amount.

5. The droplet ejection control apparatus according to claim 4,
wherein the droplet ejection amount control unit causes droplet ejection amounts to change at a period of even numbers of nozzles in a region where overlap printing is performed.

6. The droplet ejection control apparatus according to claim 4,
wherein the droplet ejection amount control unit causes droplet ejection amounts to change at a period of a predetermined number of nozzles in a region where overlap printing is performed, and the sum total of the droplet ejection amounts is equal to or greater than the reference amount at the majority of the nozzles and is equal to or smaller than the reference amount at less than half the nozzles in a state where an impact position error of droplets is not generated.

7. The droplet ejection control apparatus according to claim 1,
wherein, in a region where overlap printing is performed with the nozzles, the droplet ejection amount control unit causes overlap printing to be performed with the nozzles of the same color and thereafter causes another overlap printing to be performed with the nozzles of a different color from the previously printed color.

8. A droplet ejection control method configured to cause a droplet ejection device including a head in which a plurality of nozzles are disposed being aligned in a predetermined direction to perform overlap printing in a predetermined region and perform normal printing which does not overlap in another predetermined region, the droplet ejection control method comprising:
changing droplet ejection amounts for each raster in a region where the overlap printing is performed so that a sum total of the droplet ejection amounts for each raster in the region where the overlap printing is performed sequentially changes to be an amount equal to or greater than a reference amount that is defined by a sum total of droplet ejection amounts in a normal region and to be an amount smaller than the reference amount.

9. A computer program product for droplet ejection control configured to cause a droplet ejection device including a head in which a plurality of nozzles are disposed being aligned in a predetermined direction to perform overlap printing in a predetermined region and perform normal printing which does not overlap in another predetermined region, the program comprising:
causing a computer to realize a function for changing droplet ejection amounts in a region where the overlap printing is performed so that a sum total of the droplet ejection amounts for each raster in the region where the overlap printing is performed sequentially changes to be an amount equal to or greater than a reference amount that is defined by a sum total of droplet ejection amounts in a normal region and to be an amount smaller than the reference amount.

* * * * *